United States Patent
Haro (10) Patent No.: US 6,762,858 B2
(45) Date of Patent: Jul. 13, 2004

(54) COLOR MANAGEMENT SYSTEM AND METHOD FOR COLOR PRINTING SYSTEM

(75) Inventor: Antonio Vazquez Haro, Jalisco (MX)

(73) Assignee: Hewlett-Packard Development Company, L.P., Houston, TX (US)

(*) Notice: Subject to any disclaimer, the term of this patent is extended or adjusted under 35 U.S.C. 154(b) by 349 days.

(21) Appl. No.: 09/952,959

(22) Filed: Sep. 14, 2001

(65) Prior Publication Data
US 2003/0053134 A1 Mar. 20, 2003

(51) Int. Cl.[7] .............................................. G06K 15/00
(52) U.S. Cl. ..................... 358/1.9; 358/3.23; 358/1.16
(58) Field of Search ........................ 358/1.9, 2.1, 3.23, 358/1.16, 1.17, 500, 501, 502, 503, 504

(56) References Cited

U.S. PATENT DOCUMENTS

| | | | |
|---|---|---|---|
| 5,107,332 A | * 4/1992 | Chan | 358/80 |
| 5,272,518 A | 12/1993 | Vincent | 356/405 |
| 5,381,349 A | 1/1995 | Winter et al. | 364/526 |
| 5,671,059 A | 9/1997 | Vincent | 356/402 |
| 5,689,350 A | 11/1997 | Rolleston | 358/504 |
| 5,760,913 A | 6/1998 | Falk | 358/298 |
| 5,818,960 A | 10/1998 | Gregory, Jr. et al. | 382/167 |

FOREIGN PATENT DOCUMENTS

JP  408058158  * 3/1996

OTHER PUBLICATIONS

International Color Consortium Specification: File Format for Color Profiles, ICC.1: Sep. 9, 1998.
International Color Consortium Document: Addendum 2 to Spec. ICC.1: Sep. 1998, ICC.1A: Sep. 4, 1999.

* cited by examiner

*Primary Examiner*—Jerome Grant, II (57) ABSTRACT

A color printing system includes a color printer adapted to receive an image file and an original color profile associated with the image file and print at least one color output based on the image file and the original color profile. The color printing system also includes a color measurement module adapted to generate a color measurement of the color output of the color printer and a color management module adapted to compare the color measurement of the color output of the color printer with the original color profile associated with the image file. As such, the color management module determines if a variation in color exists between the color measurement of the color output and the original color profile. Thus, the color printing system also includes a color profile manager adapted to modify the original color profile and create a modified color profile if the color management module determines that the variation in color exists. Accordingly, the modified color profile compensates for the variation in color.

28 Claims, 7 Drawing Sheets

COLOR MANAGEMENT SYSTEM AND METHOD FOR COLOR PRINTING SYSTEM

THE FIELD OF THE INVENTION

The present invention relates generally to a color printing system and, more particularly to a system for automatically managing color output of the color printing system.

BACKGROUND OF THE INVENTION

When printing with a conventional color printing system, color variations in color images produced by the system are not uncommon. Such variations can occur, for example, when printing the same image at different times, when printing multiple copies of an image over the course of a print run, and/or when printing an image with different printers. Color variations in color images are caused, for example, by variations in printer technologies such as laser jet versus inkjet technologies, a print medium being used such as bond versus photographic paper, variations in toner or ink compositions, as well as variations that occur during a print run resulting in differences in images printed at the end of the print run as compared to the beginning of the print run.

In an effort to correct and/or compensate for color variations in color images produced by conventional color printing systems, color calibration systems have been developed. Existing color calibration systems, however, often require human interaction to visually assess and/or manually interpret input and/or output of such systems. Unfortunately, the requirement of human interaction introduces a subjective factor to such systems. In addition, conventional printing are often only calibrated once, for example, during manufacture. However, factors influencing variations in color images and, therefore, variations in color images themselves can vary over time.

Accordingly, a need exists for automatically maintaining color accuracy and/or color consistency of a color printing system during use of the color printing system.

SUMMARY OF THE INVENTION

One aspect of the present invention provides a color printing system. The color printing system includes a color printer adapted to receive an image file and an original color profile associated with the image file and print at least one color output based on the image file and the original color profile. The color printing system also includes a color measurement module adapted to generate a color measurement of the at least one color output of the color printer, a color management module adapted to compare the color measurement of the at least one color output of the color printer with the original color profile associated with the image file and determine if a variation in color exists between the color measurement of the at least one color output and the original color profile, and a color profile manager adapted to modify the original color profile and create a modified color profile if the color management module determines that the variation in color exists. As such, the modified color profile compensates for the variation in color.

Another aspect of the present invention provides a method of managing color output of a color printer adapted to print the color output based on an image file for the color output and an original color profile associated with the image file. The method includes generating a color measurement of the color output of the color printer, determining if a variation in color exists between the color measurement of the color output of the color printer and the original color profile associated with the image file, including comparing the color measurement of the color output with the original color profile, and modifying the original color profile associated with the image file to create a modified color profile if the variation in color exists between the color measurement of the color output and the original color profile associated with the image file.

Another aspect of the present invention provides a system for producing a book on-demand. The system includes a processing system adapted to receive and process a book request for the book, a book block preparation system adapted to prepare a book block of the book in response to a book body preparation command produced by the processing system from a data file including contents of the book, a book cover preparation system adapted to prepare a book cover of the book in response to a book cover preparation command produced by the processing system from the data file including contents of the book, and a book finishing system adapted to assemble the book block and the book cover to form the book. As such, the book cover preparation command includes an image file for the book cover and a color profile associated with the image file. In addition, the book cover preparation system includes a color printer adapted to print the book cover based on the image file and the color profile, and a color management system adapted to compare a color measurement of the book cover with the color profile and modify the color profile to create a modified color profile if a variation in color exists between the color measurement and the color profile. Thus, the modified color profile compensates for the variation in color.

Another aspect of the present invention provides a method of producing a book on-demand. The method includes receiving and processing a book request for the book including retrieving a data file which includes contents of the book and producing a book body preparation command and a book cover preparation command from the data file. In addition, the method includes preparing a book block of the book in response to the book body preparation command, preparing a book cover of the book in response to the book cover preparation command, and assembling the book block and the book cover to form the book. As such, producing the book cover preparation command includes specifying an image file for the book cover and associating a color profile with the image file. Thus, preparing the book cover includes printing the book cover based on the image file and the color profile, and includes comparing a color measurement of the book cover with the color profile associated with the image file for the book cover and modifying the color profile to create a modified color profile if a variation in color exists between the color measurement and the color profile. As such, the modified color profile compensates for the variation in color.

In one embodiment, the present invention provides a system and method of automatically managing color output of a color printing system. As such, the system and method compares a color measurement of the color output with a color profile for the color output and automatically modifies the color profile if a variation in color exists during printing.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
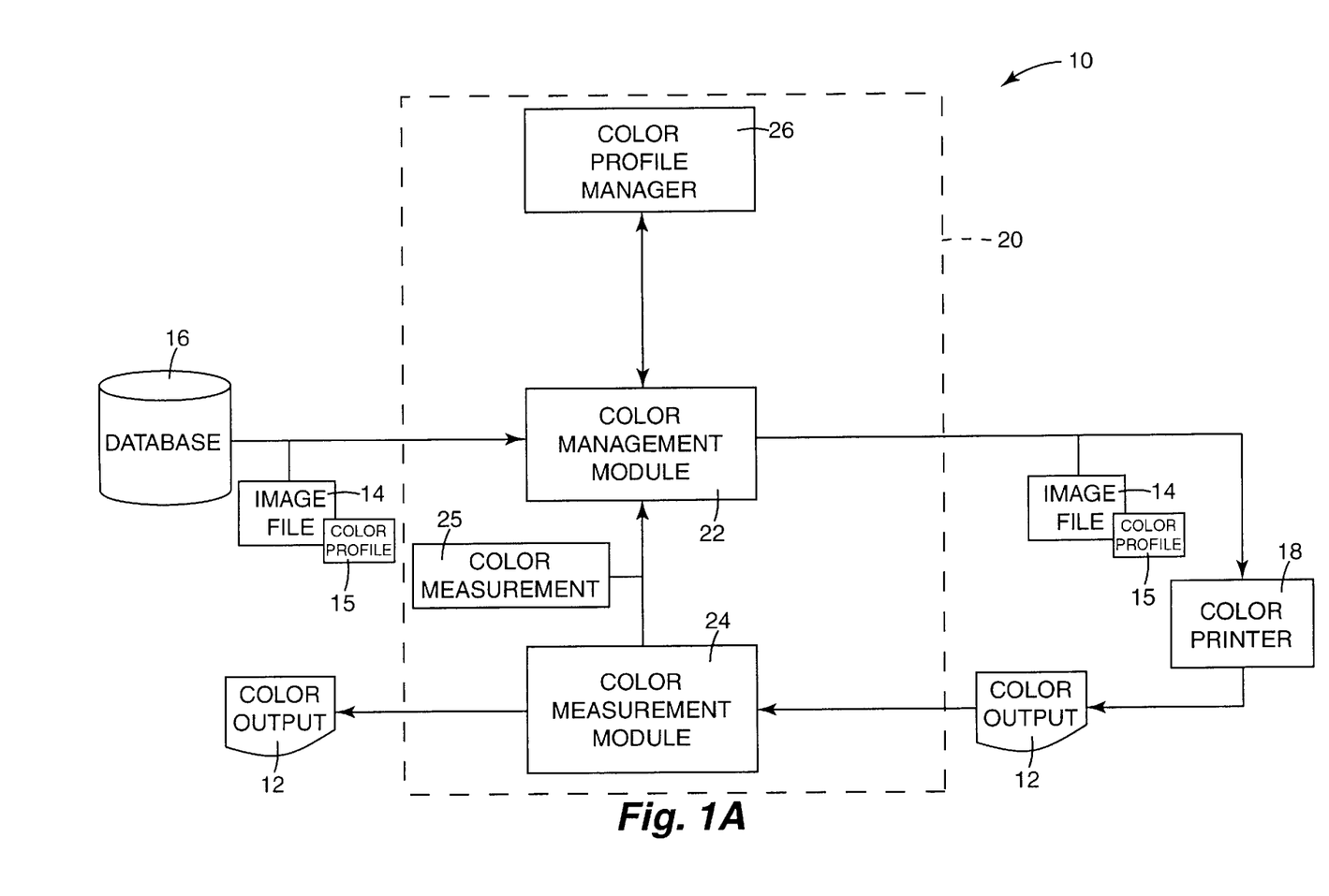
FIGS. 1A, 1B, and 1C are block diagrams illustrating one exemplary embodiment of a color printing system including a color management system according to the present invention.
Figure 1B:
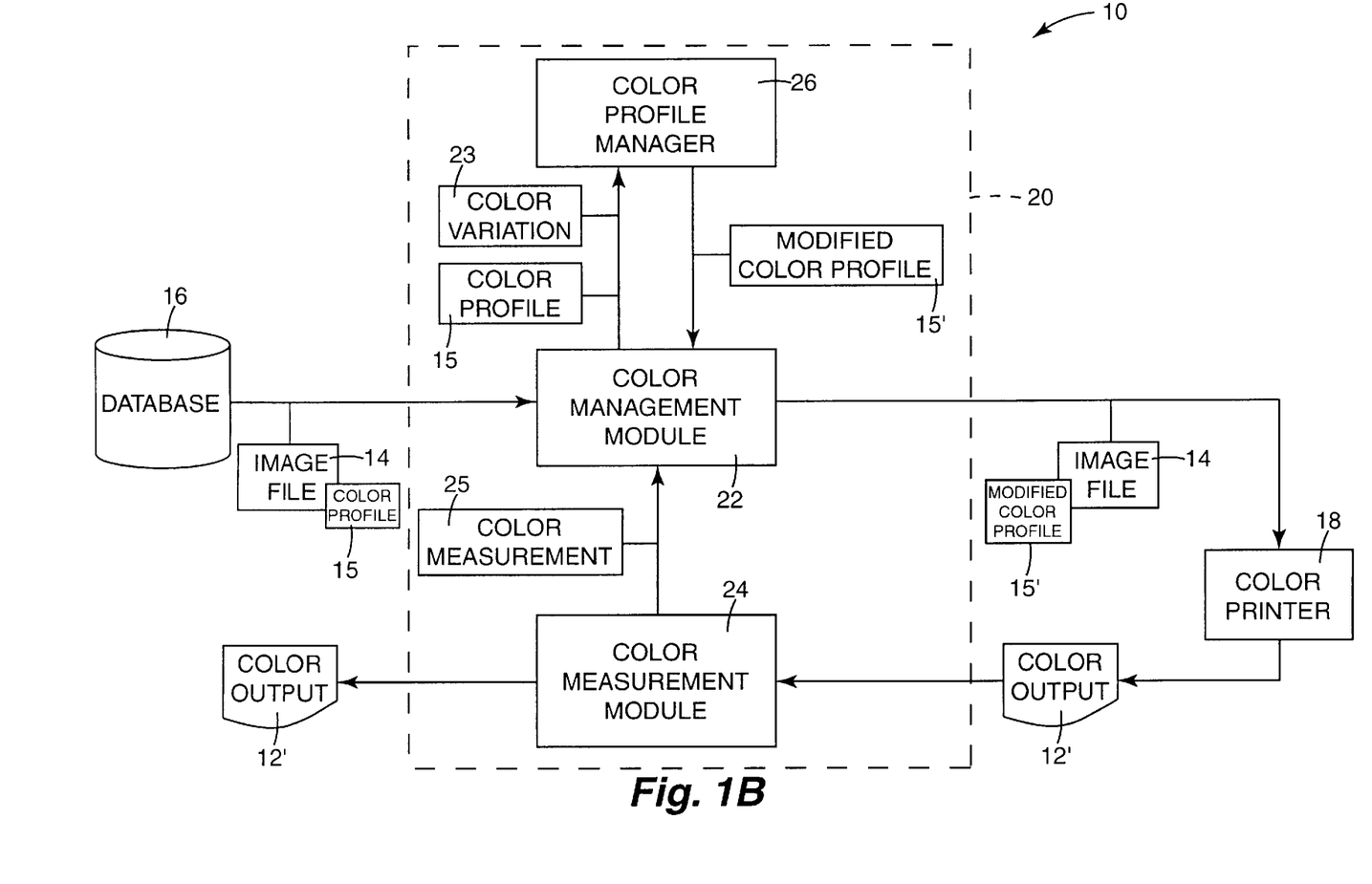
Figure 1C:
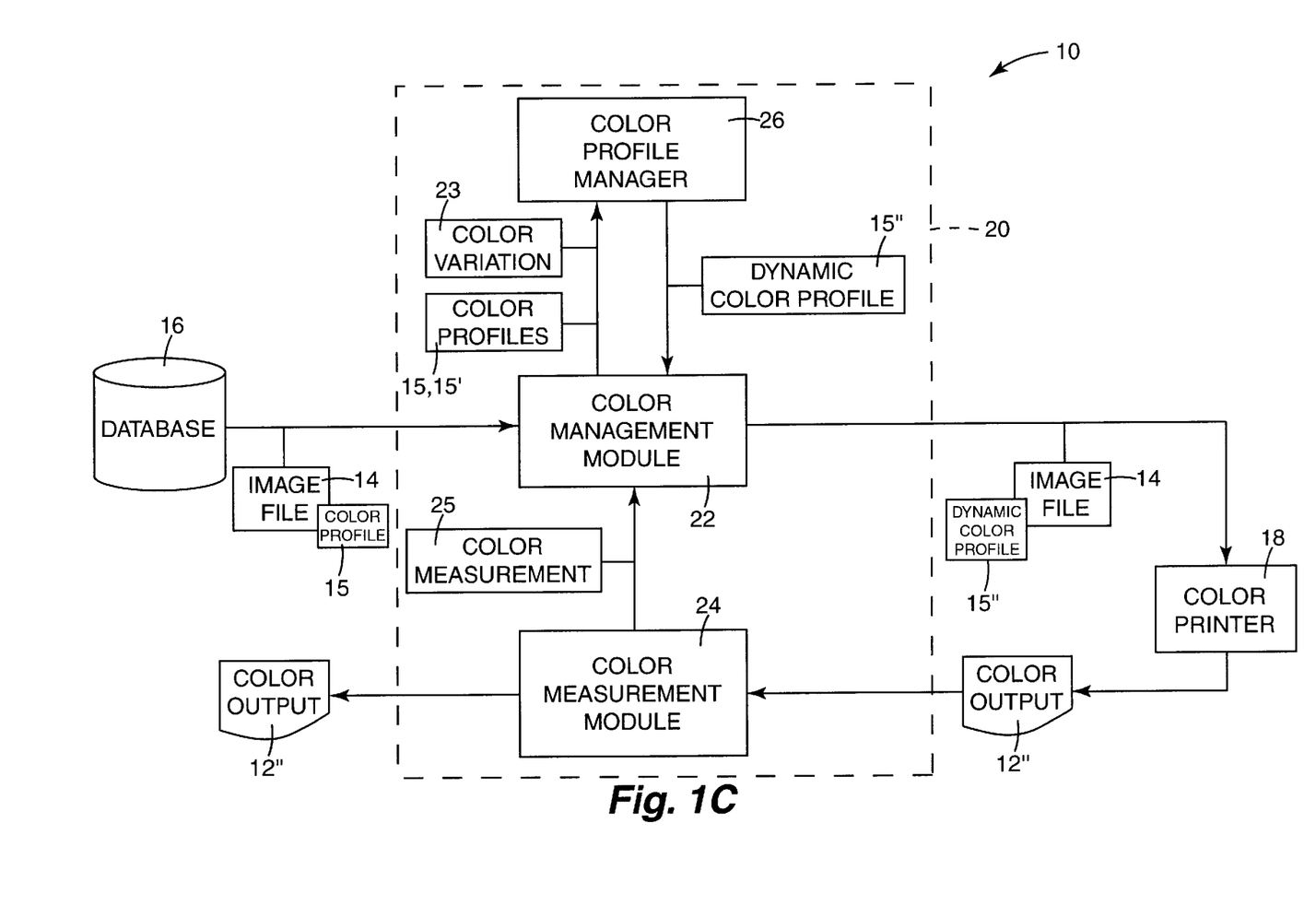

A color printing system according to the present invention is illustrated generally at 10 in FIGS. 1A, 1B, and 1C. Color printing system 10 produces a color output 12 based on an image file 14 and automatically maintains color accuracy and/or color consistency of color output 12 during printing. Color output 12, as used herein, is defined to include single and/or multiple sheet printed matter including an image or graphics with color content. In one illustrative embodiment, color output 12 includes a book cover of a book produced on-demand, as described below.

Color printing system 10 and other embodiments of the color printing system according to the present invention include several main components, one or more of which may be a software program. The software program components of the color printing system according to the present invention run on one or more computer or server systems. Programming languages suitable for use with the present invention will become apparent to those skilled in the art after reading the present application.

In one exemplary embodiment, color printing system 10 includes a data storage system 16. Data storage system 16 constitutes a database of one or more data files for color printing system 10. More specifically, data storage system 16 maintains or stores image files 14 to be printed by color printing system 10 as color output 12. Examples of data storage system 16 include non-volatile memory (e.g., a hard disk drive or other persistent storage device) and may include volatile memory (e.g., random access memory (RAM)). Another example of data storage system 16 may include a relational database management server (RDBMS).

In one exemplary embodiment, color printing system 10 includes data storage system 16, a color printer 18, and a color management system 20. As such, image files 14 from data storage system 16 provide input to color management system 20 which, in turn, provides input to color printer 18. Thus, color printer 18 produces or prints color output 12 based on image file 14 and inputs color output 12 to color management system 20 for analysis and subsequent distribution. Color printer 18, as used herein, is defined to include a printing device capable of producing printed color output, including textural and/or graphical images, on a print medium, such as paper, in response to electronic signals. Examples of such a printing device include a laser printer, an inkjet printer, etc. In addition, color printer 18 may include multiple printing devices each associated with and managed by color management system 20.

In one exemplary embodiment, a color profile 15 is associated with each image file 14. As such, image file 14 is input to color management system 20 with a respective color profile 15. Color profile 15 defines color values for printing of color output 12. Preferably, color profile 15 includes an International Color Consortium (ICC) color profile. As an ICC color profile, color profile 15 includes color spaces for transforming color information.

In one exemplary embodiment, color management system 20 includes a color management module 22, a color measurement module 24, and a color profile manager 26. Color management system 20, including color management module 22, color measurement module 24, and color profile manager 26 includes hardware, software, firmware, or a combination of these. In one preferred embodiment, color management system 20, including color management module 22, color measurement module 24, and color profile manager 26 includes a computer server or other microprocessor based system capable of performing a sequence of logic operations. In addition, color management system 20, including color management module 22, color measurement module 24, and color profile manager 26 can include a microprocessor embedded system/appliance incorporating tailored appliance hardware and/or dedicated single purpose hardware.

As illustrated in FIG. 1A, color management module 22 receives image file 14 and color profile 15 associated with image file 14 from data storage system 16. As such, color management module 22 inputs image file 14 and color profile 15 to color printer 18. Thus, color printer 18 prints color output 12 based on image file 14 and color profile 15 associated with image file 14.

Figure 2:
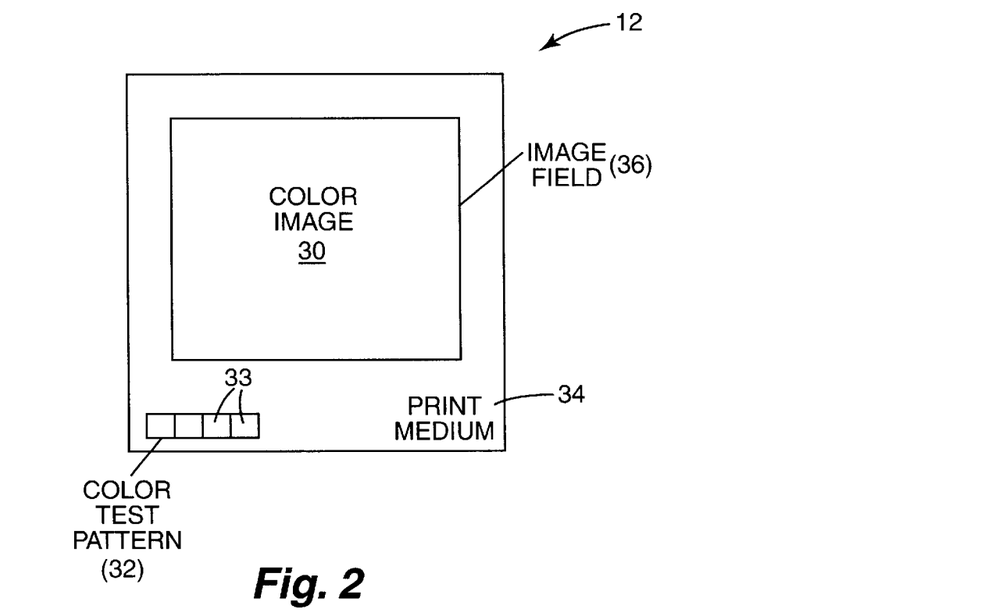
FIG. 2 is a diagram illustrating one exemplary embodiment of color output from the color printing system of FIGS. 1A, 1B, and 1C.

As illustrated in FIG. 2, color output 12 includes an image 30 and a color test pattern 32 both printed on a print medium 34 by color printer 18. Print medium 34 includes, for example, any type of suitable material, such as paper, cardstock, transparencies, Mylar, and the like. In one exemplary embodiment, print medium 34 includes an image field 36 within which image 30 is printed. As such, color test pattern 32 is printed on print medium 34 in an area outside or beyond image field 36. While color test pattern 32 is illustrated as being printed on the bottom of print medium 34, it is within the scope of the present invention for color test pattern 32 to be printed in other areas or combination of areas including the top or side of print medium 34.

In one exemplary embodiment, color test pattern 32 includes a plurality of color bars or color patches 33. Color patches 33 are printed based on color profile 15 as associated with image file 14. As such, color patches 33 represent an ability of color printer 18 to print color output 12 and, more specifically, image 30 in accordance with color profile 15.

As illustrated in FIG. 1A, after color output 12 has been printed, color output 12 is input to color measurement module 24. As such, color measurement module 24 measures a color content or color value of color output 12. More specifically, color measurement module 24 measures a color content of color test pattern 32 to assess the colors produced by color printer 18. Accordingly, color measurement module 24 generates a color measurement 25 of color test pattern 32. Since color test pattern 32 and image 30 are both based on color profile 15, color measurement 25 represents a color content or color value of image 30.

Figure 3:
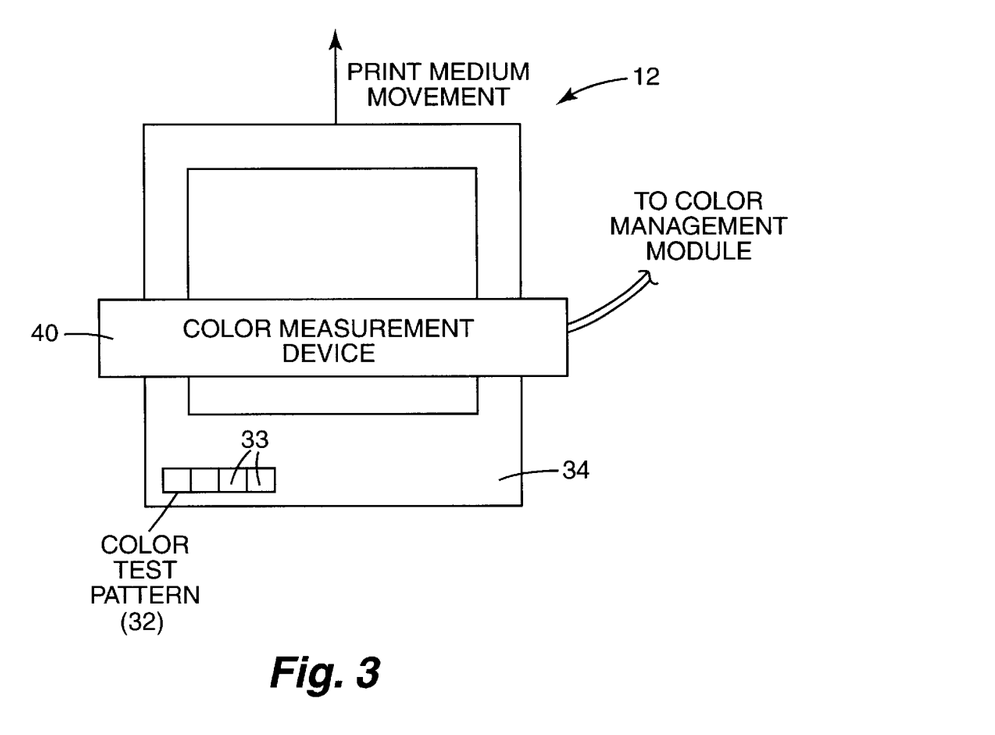
FIG. 3 is a diagram illustrating one exemplary embodiment of a portion of a color measurement module of the color management system of the color printing system of FIGS. 1A, 1B, and 1C measuring a color content of the color output of FIG. 2.

In one exemplary embodiment, as illustrated in FIG. 3, color measurement module 24 includes a color measurement device 40 which reads or views color test pattern 32 of color output 12. Color measurement device 40 includes, for example, a spectrophotometer or a colorimeter which measures a color content or color value of an image as is well known in the art. Thus, color measurement device 40 measures a color content or color value of color output 12 and, more specifically, color test pattern 32. As such, color measurement device 40 develops color measurement 25 of color test pattern 32.

It is understood that color measurement device 40 may be included as a part of color printer 18 or may be separate from color printer 18. In addition, color measurement device 40 may measure color content of color output 12 while color output 12 is being printed or after color output 12 has been printed. Furthermore, color measurement device 40 may be held stationary as color output 12 is passed by color measurement device 40 or color measurement device 40 may scan or traverse color output 12 as color output 12 is held stationary.

As illustrated in FIG. 1B, color measurement module 24 inputs color measurement 25 to color management module 22 for processing. As such, color management module 22 compares color measurement 25 with color profile 15 as associated with image file 14. Thus, color management module 22 assesses a color accuracy and/or color consistency of color printer 18 in producing color content of image 30 as defined by color profile 15. Accordingly, if color management module 22 determines that a variation in color exists, color management module 22 identifies a color variation 23 for color output 12 and inputs color variation 23 to color profile manager 26.

In addition to color variation 23, color profile manager 26 also receives color profile 15 associated with image file 14 as input from color management module 22. As such, color profile manager 26 considers color variation 23 and modifies color profile 15, as an original color profile, to create a modified color profile 15' for color output 12 based on color variation 23. Thus, color profile manager 26 inputs modified color profile 15' to color management module 22 which, in turn, associates modified color profile 15' with image file 14. It is understood that only one color profile, for example, color profile 15 or modified color profile 15', is associated with image file 14 at one time.

Color management module 22 inputs image file 14 and modified color profile 15' to color printer 18. As such, color printer 18 prints color output 12' based on image file 14 and modified color profile 15' associated with image file 14. Modified color profile 15', therefore, compensates for color variation 23 of color output 12 as measured by and reflected in color measurement 25. After color output 12' has been printed, color output 12' is input to color measurement module 24. As such, color measurement module 24 measures a color content or color value of color output 12', as described above.

In one exemplary embodiment, as illustrated in FIG. 1C, color profile manager 26 develops a dynamic color profile 15" for color output 12. Dynamic color profile 15" is based on color variation 23 of a plurality of color outputs 12 and, therefore, color measurement 25 of color outputs 12. More specifically, color profile manager 26 develops dynamic color profile 15" by recording or registering a plurality of color profiles 15, including modified color profiles 15', for color outputs 12. Thus, dynamic color profile 15" is based on a plurality of color profiles 15 including one or more original color profiles 15 and/or one or more modified color profiles 15". Color profile manager 26 inputs dynamic color profile 15" to color management module 22 which, in turn, associates dynamic color profile 15" with image file 14 and inputs image file 14 and dynamic color profile 15" to color printer 18. As such, color printer 18 prints color output 12" based on image file 14 and dynamic color profile 15".

Dynamic color profile 15" compensates for variations in color between color output 12 and color profile 15 during printing and, more specifically, during a print run. Such variations result, for example, from a variation of marking material such as toner or ink for color printer 18, a temperature of color printer 18, and/or a print medium being printed on by color printer 18. Variations in marking material for color printer 18 result, for example, from composition variations between replaceable supplies of marking material for color printer 18 such as when a toner or ink cartridge is replaced. Variations in compositions of marking material can affect color output 12. In addition, as color printer 18 warms up, for example, during the course of a print run, a temperature of color printer 18 can vary. Thus, temperature variations in color printer 18 can also affect color output. Furthermore, a variation in print medium being printed on by color printer 18, for example, bond paper versus photographic paper, can also affect color output 12. Dynamic color profile 15", therefore, compensates for such variations in color output 12 during subsequent printing operations and, more specifically, subsequent printing operations under similar printing conditions.

Figure 4:
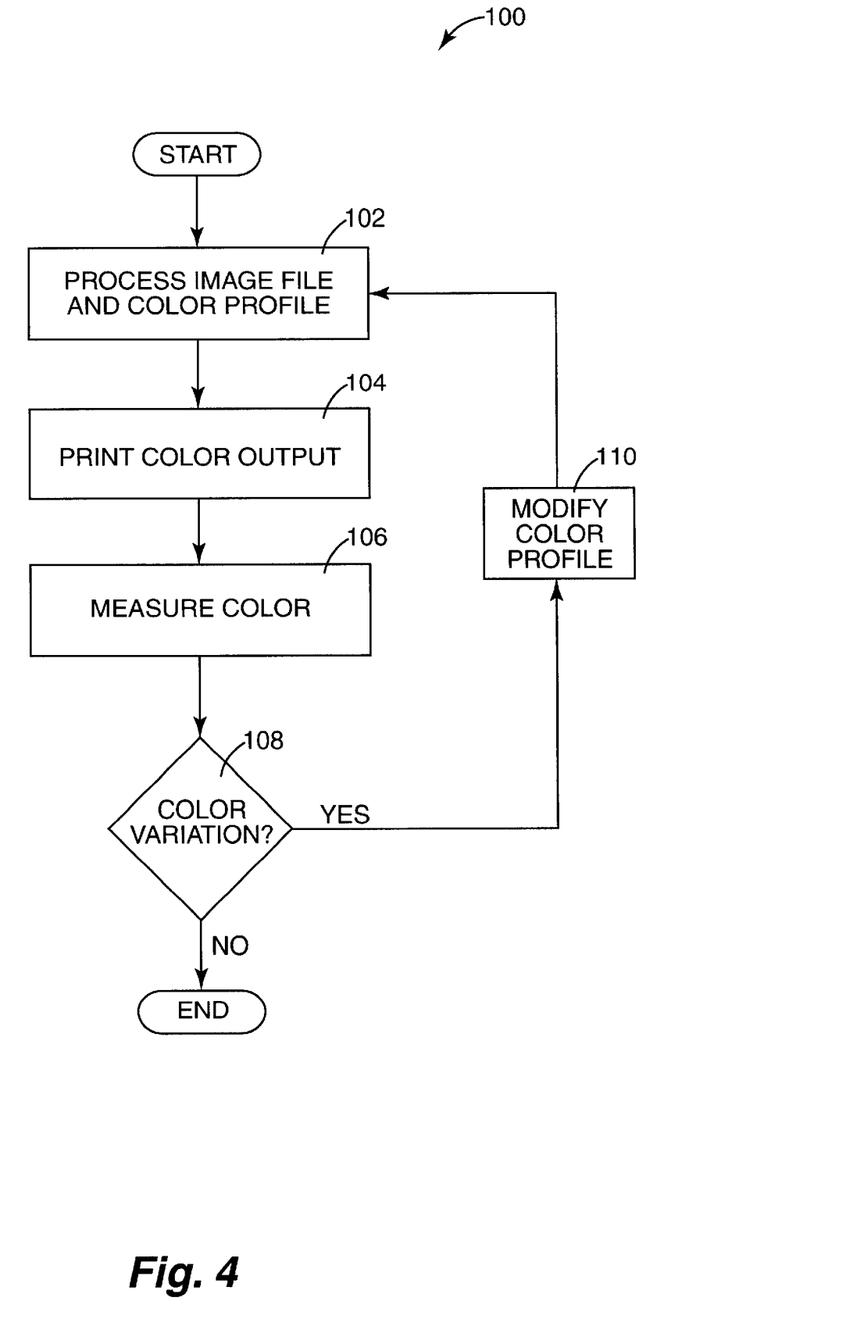
FIG. 4 is a flow diagram illustrating one exemplary embodiment of a method of managing color output of a color printing system according to the present invention.

In FIG. 4, a flow diagram illustrating one exemplary embodiment of a method of managing color output 12 of color printing system 10 according to the present invention as illustrated generally at 100. Reference is also made to FIGS. 1–3. In step 102, image file 14 and color profile 15, associated with image file 14, are processed and submitted to color printer 18. Image file 14 and color profile 15 are processed by color management module 22 based on input from color measurement module 24 and/or color profile manager 26.

Next, in step 104, color printer 18 prints color output 12, including image 30 and color test pattern 32, based on image file 14 and color profile 15. Then, in step 106, a color content of color output 12 is measured. More specifically, color measurement 25 of color test pattern 32 of color output 12 is generated by color measurement module 24.

Next, in step 108, whether a variation in color between color output 12 and color profile 15 exists is assessed. More specifically, color management module 22 compares color measurement 25 of color output 12 and, more specifically, color test pattern 32 with color profile 15 as associated with image file 14 for color output 12. Thus, if a variation in color does not exist, method 100 concludes.

If, however, color management module 22 determines that a variation in color does exist, step 110 is performed. In step 110, color profile 15 is modified. More specifically, color profile manager 26 considers color variation 23, as determined by color management module 22, and color profile 15, as associated with image file 14 for color output 12, and generates modified color profile 15' to compensate for the variation in color.

After step 110, method 100 returns to step 102. As such, in step 102, color management module 22 associates modified color profile 15' with image file 14 and submits image file 14 and modified color profile 15' to color printer 18 for printing of color output 12' in step 104 and processing of color output 12' in steps 106 and 108, as described above.

Figure 5:
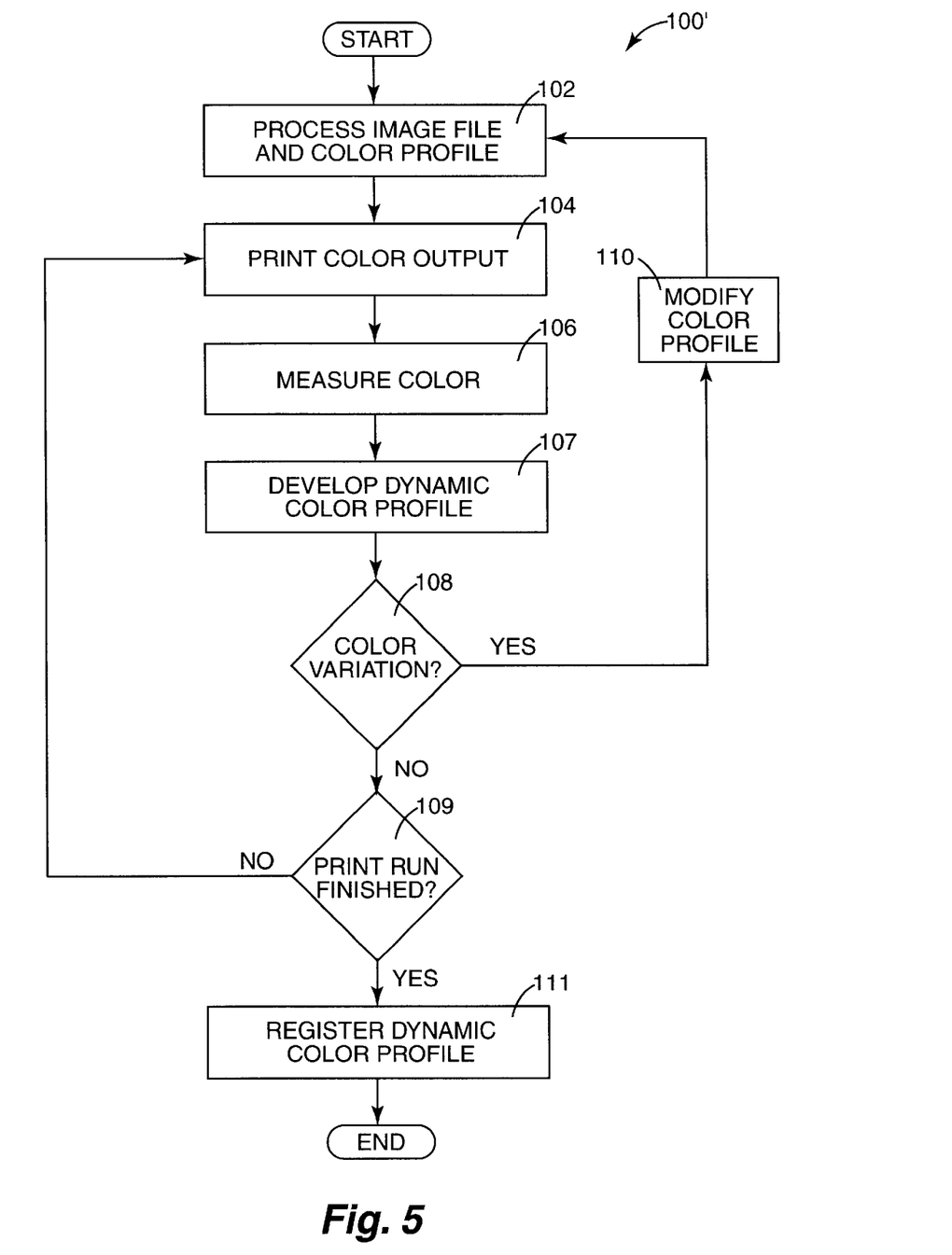
FIG. 5 is a flow diagram illustrating another exemplary embodiment of a method of managing color output of a color printing system according to the present invention.

In FIG. 5, a flow diagram illustrating another exemplary embodiment of method 100 of managing color output 12 of color printing system 10 according to the present invention is illustrated generally at 100'. Method 100' is similar to method 100 and includes steps 102, 104, 106, 108, and 110 as illustrated in FIG. 4 and described above. Method 100', however, develops dynamic color profile 15" during a print run or printing of a plurality of color outputs 12.

After measuring of color output 12 in step 106, method 100' includes step 107. In step 107, dynamic color profile 15" is developed by registering or recording color profile 15, including modified color profile 15', as associated with image file 14. In addition, if, in step 108, color management module 22 determines that a variation in color does not exist, step 109 is performed. In step 109, whether the print run is finished is assessed. Thus, if the print run is not finished, method 100' returns to step 104 to continue printing color output 12. As such, color profile manager 26 registers color profile 15 in step 107 for the development of dynamic color profile 15".

If, in step 108, color management module 22 determines that a variation in color does exist, step 110 is performed and modified color profile 15' is created as described above. As such, image file 14 and modified color profile 15' are processed and submitted to color printer 18 in step 102 and color output 12 is printed in step 104, as described above. Thus, color profile manager 26 registers modified color profile 15' in step 107 for the development of dynamic color profile 15". Color profile manager 26, therefore, builds or maintains dynamic color profile 15" in step 107 based on color profiles 15 and/or modified color profiles 15' developed during the print run.

If, however, the print run is finished, as assessed in step 109, step 111 is performed. In step 111, dynamic color profile 15" is registered or stored. More specifically, color profile manager 26 identifies and associates, for example, the printing conditions of the print run during which dynamic color profile 15" was developed. Thus, dynamic color profile 15" may be used during subsequent print runs under similar printing conditions.

By monitoring color output 12 of color printing system 10 during printing, color management system 20 ensures accurate and/or consistent color output of color printing system 10. More specifically, by generating color measurement 25 of color output 12 and comparing color measurement 25 with color profile 15 associated with image file 14 for color output 12, color management system 20 can compensate for a variation in color between color output 12 and color profile 15 for color output 12. Thus, color management system 20 automatically compensates for a variation in color during printing by generating modified color profile 15' for color output 12 and associating modified color profile 15' with image file 14 for color output 12.

Figure 6:
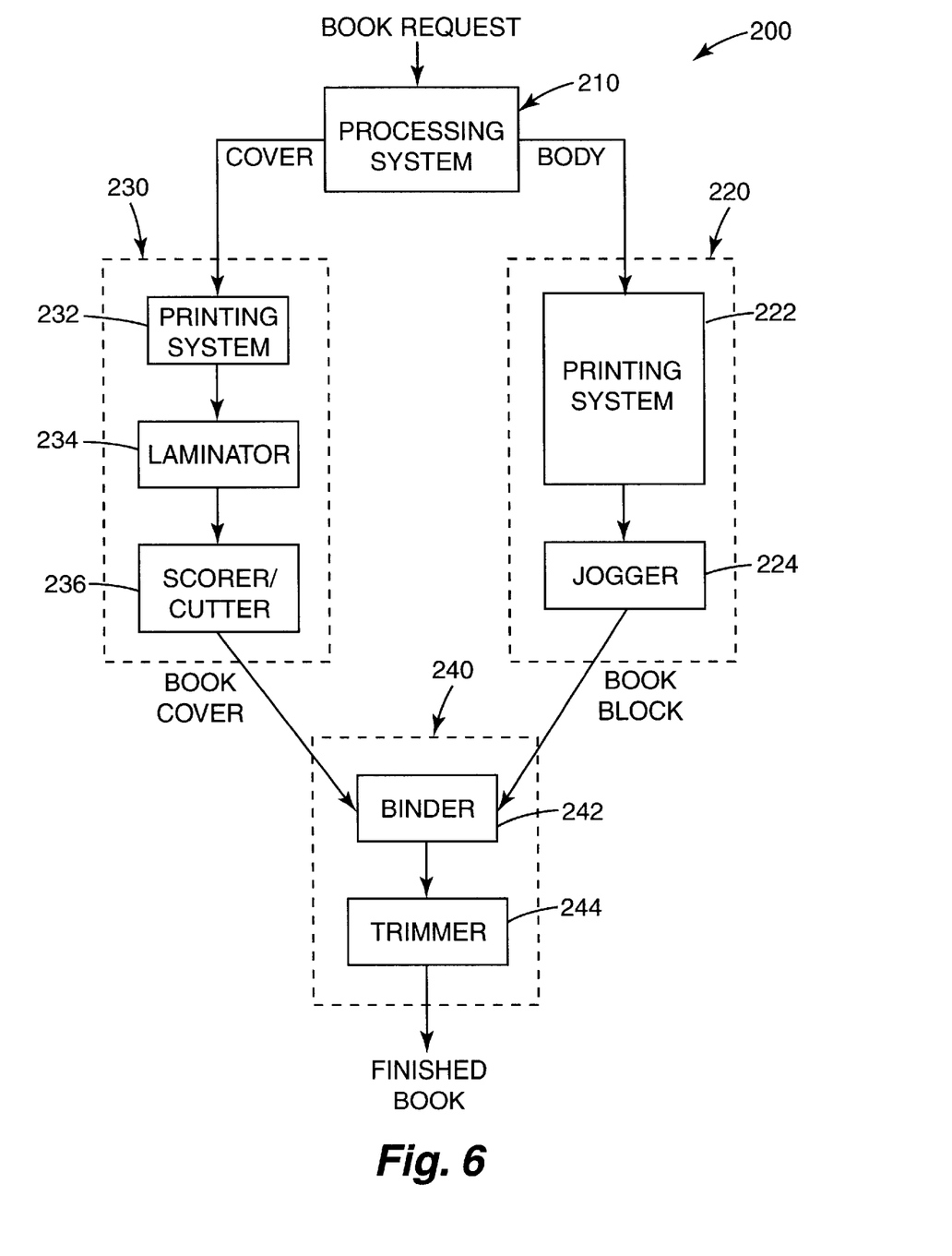
FIG. 6 is a block diagram illustrating one exemplary embodiment of a books-on-demand system including a color printing system having a color management system according to the present invention.

In one illustrative embodiment, color printing system 10 is included in a books-on-demand system illustrated generally at 200 in FIG. 6. Books-on-demand system 200 receives orders for single and/or multiple copies of a book and produces the book on-demand. More specifically, books-on-demand system 200 retrieves an electronic file of the book and then prints and binds a copy of the book.

In one exemplary embodiment, books-on-demand system 200 includes a processing system 210, a book block preparation system 220, a book cover preparation system 230, and a book finishing system 240. In one exemplary embodiment, processing system 210 includes hardware and software for receiving and processing a book request. Processing system 210 retrieves an electronic file of a book being requested and produces a print command for a body of the book and a print command for a cover of the book.

In response to the print commands, book block preparation system 220 and book cover preparation system 230 prepare a book block and a book cover, respectively. Thereafter, book finishing system 240 assembles the book block and the book cover to form a finished book. The book cover includes a sheet or piece of material cut to a desired size and is formed from suitable sheet material such as paper, cardboard, and/or plastic film. The book cover can also include a cover image in the form of characters and/or graphics as is well known in the art. The book block includes a plurality of sheets of paper which form a body of the book. The body of the book includes, for example, a table of contents, text, index, etc.

In one exemplary embodiment, book block preparation system 220 includes a printing system 222 and a jogger 224. Printing system 222 includes one or more printers, preferably black and white printers, which print the body of the book on several sheets of paper. Thereafter, jogger 224 vibrates or shakes the sheets to align the edges of the paper in forming the book block.

In one exemplary embodiment, book cover preparation system 230 includes a printing system 232, a laminator 234, and a scorer/cutter 236. To facilitate accurate and consistent color printing of the book cover, printing system 232 includes color printing system 10. Printing system 232, therefore, includes color printer 18 which prints the book cover and color management system 20 which manages the color printing. As such, color printing system 10 compensates for color variations in book covers produced by books-on-demand system 200. Preferably, laminator 234 laminates the book cover and scorer/cutter 236 scores the book cover with crease lines which facilitate bending of the book cover along a spine of the book block.

In one exemplary embodiment, book finishing system 240 includes a book binder 242 and a book trimmer 244. As such, the book cover is registered in book binder 242 and the book block is positioned on the book cover. Then, the book block is bound with the book cover by book binder 242 as is well known in the art. Thereafter, book trimmer 244 trims the book cover if necessary. Thus, the finished book is produced.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A color printing system, comprising:

a color printer adapted to receive an image file and an original color profile associated with the image file and print at least one color output based on the image file and the original color profile;

a color measurement module adapted to generate a color measurement of the at least one color output;

a color management module adapted to compare the color measurement of the at least one color output with the original color profile and determine if a variation in color exists between the color measurement of the at least one color output and the original color profile; and a color profile manager adapted to modify the original color profile and create a modified color profile if the color management module determines that the variation in color exists, wherein the modified color profile compensates for the variation in color, wherein the at least one color output includes a first color output and a second color output printed after the first color output, and wherein the color management module is adapted to compare a color measurement of the second color output with a color measurement of the first color output to determine if a variation in color exists between the second color output and the first color output.

2. The color printing system of claim 1, wherein the original color profile includes an International Color Consortium (ICC) color profile.

3. The color printing system of claim 1, wherein the color profile manager is adapted to associate the modified color profile with the image file, wherein the color printer is adapted to print a modified color output based on the image file and the modified color profile, and wherein the color management module is adapted to compare a color measurement of the modified color output with the original color profile and determine if a variation in color exists between the color measurement of the modified color output and the original color profile.

4. The color printing system of claim 1, wherein the at least one color output includes a plurality of color outputs, and wherein the color profile manager is adapted to develop a dynamic color profile based on a variation in color between a color measurement of each of the plurality of color outputs and the original color profile.

5. The color printing system of claim 4, wherein the color profile manager is adapted to record a respective color profile of each of the plurality of color outputs for the dynamic color profile and register the dynamic color profile for subsequent printing.

6. The color printing system of claim 4, wherein the dynamic color profile includes a plurality of color profiles.

7. The color printing system of claim 4, wherein the color profile manager is adapted to associate the dynamic color profile with the image file, and wherein the color printer is adapted to print a second plurality of color outputs based on the image file and the dynamic color profile.

8. The color printing system of claim 4, wherein the dynamic color profile compensates for at least one of a variation of marking material for the color printer, a temperature of the color printer, and a print medium being printed on by the color printer.

9. The color printing system of claim 1, wherein the at least one color output of the color printer includes an image and a color test pattern, and wherein the color measurement module is adapted to generate the color measurement of the at least one color output from the color test pattern.

10. The color printing system of claim 9, wherein the image is printed within an image field and the color test pattern is printed outside the image field.

11. The color printing system of claim 1, wherein the color measurement module includes one of a colorimeter and a spectrophotometer.

12. A method of managing color output of a color printer adapted to print the color output based on an image file and an original color profile associated with the image file, the method comprising:

generating a color measurement of the color output of the color printer;

determining if a variation in color exists between the color measurement of the color output and the original color profile, including comparing the color measurement of the color output with the original color profile; and modifying the original color profile to create a modified color profile if the variation in color exists between the color measurement of the color output and the original color profile, wherein the color output of the color printer includes a first color output and a second color output printed after the first color output, and wherein determining if a variation in color exists includes comparing a color measurement of the second color output with a color measurement of the first color output.

13. The method of claim 12, wherein the original color profile includes an International Color Consortium (ICC) color profile.

14. The method of claim 12, further comprising:

associating the modified color profile with the image file, wherein the color printer is adapted to print a modified color output based on the image file and the modified color profile, and wherein determining if a variation in color exists includes comparing a color measurement of the modified color output with the original color profile.

15. The method of claim 12, wherein the color output of the color printer includes a plurality of color outputs, and further comprising:

defining a dynamic color profile for the color printer based on a variation in color between a color measurement of each of the plurality of color outputs and the original color profile.

16. The method of claim 15, wherein defining the dynamic color profile includes recording a respective color profile of each of the plurality of color outputs and registering the dynamic color profile for subsequent printing.

17. The method of claim 15, wherein the dynamic color profile includes a plurality of color profiles.

18. The method of claim 15, further comprising:

associating the dynamic color profile with the image file.

19. The method of claim 15, wherein defining the dynamic color profile includes compensating for at least one of a variation of marking material for the color printer, a temperature of the color printer, and a print medium being printed on by the color printer.

20. The method of claim 12, wherein the color output of the color printer includes an image and a color test pattern, and wherein generating the color measurement of the color output includes reading the color test pattern of the color output.

21. A system for producing a book on-demand, the system comprising:

a processing system adapted to receive and process a book request for the book, the processing system adapted to retrieve a data file including contents of the book and produce a book body preparation command and a book cover preparation command from the data file;

a book block preparation system adapted to prepare a book block of the book in response to the book body preparation command;

a book cover preparation system adapted to prepare a book cover of the book in response to the book cover preparation command; and a book finishing system adapted to assemble the book block and the book cover to form the book, wherein the book cover preparation command includes an image file for the book cover and a color profile associated with the image file, and wherein the book cover preparation system includes a color printer adapted to print the book cover based on the image file and the color profile, and a color management system adapted to compare a color measurement of the book cover with the color profile and modify the color profile to create a modified color profile if a variation in color exists between the color measurement and the color profile, wherein the modified color profile compensates for the variation in color.

22. The system of claim 21, wherein the color profile includes an International Color Consortium (ICC) color profile.

23. The system of claim 21, wherein the color management system of the book cover preparation system is adapted to associate the modified color profile with the image file for the book cover, wherein the color printer of the book cover preparation system is adapted to print a modified book cover based on the image file and the modified color profile, and wherein the color management system of the book cover preparation system is adapted to compare a color measurement of the modified book cover with the first named color profile.

24. The system of claim 21, wherein the color management system of the book cover preparation system is adapted to develop a dynamic color profile for the color printer of the book cover preparation system based on a variation in color between a color measurement of a plurality of book covers and the first named color profile.

25. A method of producing a book on-demand, the method comprising:

receiving and processing a book request for the book including retrieving a data file which includes contents of the book and producing a book body preparation command and a book cover preparation command from the data file;

preparing a book block of the book in response to the book body preparation command;

preparing a book cover of the book in response to the book cover preparation command; and assembling the book block and the book cover to form the book, wherein producing the book cover preparation command includes specifying an image file for the book cover and associating a color profile with the image file, and wherein preparing the book cover includes printing the book cover based on the image file and the color profile and includes comparing a color measurement of the book cover with the color profile associated with the image file for the book cover and modifying the color profile to create a modified color profile if a variation in color exists between the color measurement and the color profile, wherein the modified color profile compensates for the variation in color.

26. The method of claim 25, wherein the color profile includes an International Color Consortium (ICC) color profile.

27. The method of claim 25, wherein preparing the book cover further includes associating the modified color profile with the image file for the book cover, printing a modified book cover based on the image file and the modified color profile, and comparing a color measurement of the modified book cover with the first named color profile.

28. The method of claim 25, wherein prepering the book cover further includes developing a dynamic color profile based on a variation of color between a color measurement of a plurality of sequential book covers and the first named color profile.

* * * * *

UNITED STATES PATENT AND TRADEMARK OFFICE
CERTIFICATE OF CORRECTION

PATENT NO.     : 6,762,858 B2
DATED          : July 13, 2004
INVENTOR(S)    : Antonio Vazquez Haro It is certified that error appears in the above-identified patent and that said Letters Patent is hereby corrected as shown below:

Column 12,
Line 37, delete "prepering" and insert in lieu thereof -- preparing --.

Signed and Sealed this

Twenty-seventh Day of September, 2005

JON W. DUDAS
*Director of the United States Patent and Trademark Office*